(12) United States Patent
He et al.

(10) Patent No.: US 6,636,306 B2
(45) Date of Patent: Oct. 21, 2003

(54) OPTICAL SPECTRUM ANALYZER

(75) Inventors: Gang He, Sainte-Foy (CA); Daniel Gariépy, Stoneham (CA); Gregory Walter Schinn, Quebec City (CA)

(73) Assignee: EXFO Electro-Optical Engineering Inc., Quebec (CA)

( * ) Notice: Subject to any disclaimer, the term of this patent is extended or adjusted under 35 U.S.C. 154(b) by 336 days.

(21) Appl. No.: 09/753,673

(22) Filed: Jan. 4, 2001

(65) Prior Publication Data

US 2001/0030745 A1 Oct. 18, 2001

Related U.S. Application Data

(60) Provisional application No. 60/174,844, filed on Jan. 7, 2000.

(51) Int. Cl.[7] .............................. G01J 3/28; G01J 3/447
(52) U.S. Cl. ..................... 356/327; 356/328; 356/334
(58) Field of Search ................................ 356/326–328, 356/331, 334

(56) References Cited

U.S. PATENT DOCUMENTS

| | | | |
|---|---|---|---|
| 4,995,724 A | | 2/1991 | Sonobe et al. |
| 5,233,405 A | | 8/1993 | Wildnauer et al. |
| 5,532,818 A | | 7/1996 | Tokumoto |
| 5,594,744 A | | 1/1997 | Lefevre et al. |
| 5,802,085 A | | 9/1998 | Lefevre et al. |
| 5,886,785 A | | 3/1999 | Lefevre et al. |
| 6,108,083 A | * | 8/2000 | Machler ................ 356/328 |

FOREIGN PATENT DOCUMENTS

| DE | 195 32 611 A1 | 7/1996 |
|---|---|---|
| EP | 1 106 979 B1 | 6/2001 |
| JP | 2-194334 * | 7/1990 .............. G01J/3/18 |

OTHER PUBLICATIONS

"Optical Spectgrum Analysis", Chapter 3 extract from a textbook by Joachim Vobis and Dennis Derickson.
"Self–Alignment: A Key Improvement for Tunable External–Cavity Lasers and Optical Spectrum Analyzers", paper by Herve C. Lefevre.
"Scanning geometry for broadly tunable single–mode pulsed dye lasers", by G. Z. Zhang and K. Hakuta, Optics Letters, vol. 17, No. 14, Jul. 15, 1992.
"External–cavity diode laser using a grazing–incidence diffraction grating", by K.C. Harvey and C.J. Myatt, Optics Letters, vol. 16, No. 12, Jun. 15, 1991.

* cited by examiner

Primary Examiner—F. L. Evans
Assistant Examiner—Kara Geisel
(74) Attorney, Agent, or Firm—Thomas Adams

(57) ABSTRACT

An optical spectrum analyzer comprises a diffraction grating (DG), a polarization decomposing unit (PDM) for decomposing the input light beam into first and second light beams having mutually-perpendicular linear states of polarization, and two output ports (FP2/1, FP2/2) each for receiving from the grating, substantially exclusively, a respective one of the polarized light beams (LT, LR) after diffraction by the diffraction grating (DG). Each of the linearly-polarized light beams is directed onto the diffraction grating with its linear state of polarization at any prescribed angle to a corresponding plane of diffraction of the diffraction grating The arrangement is such that the state of polarization of the light beams, at any particular wavelength within an operating band of the analyzer remains substantially unchanged with respect to time, The analyzer also may have a reflector (RAM) for reflecting the light beams leaving the diffraction grating after diffraction a first time so as to return them to the diffraction grating for diffraction a second time.

23 Claims, 2 Drawing Sheets

OPTICAL SPECTRUM ANALYZER

This application claims benefit of U.S. Prov. No. 60/174,844 filed Jan. 7, 2000.

DESCRIPTION

1. Technical Field

This invention relates to optical spectrum analyzers and monochromators of the kind which use a diffraction grating. The invention is especially applicable to optical spectrum analyzers in which the light beam to be analyzed is applied to the diffraction grating more than once so as to obtain improved resolution, and to monocchromators for use therein.

2. Background Art

The invention is concerned especially with an optical spectrum analyzer of the kind disclosed in U.S. Pat. No. 5,986,785 issued March 1999 naming H. Lefcvre et al. as inventors. Lefevre et al. disclosed an optical spectrum analyzer comprising a diffraction grating and a dihedral reflector. The input light beam for analysis is received via an input/output port, collimated, and passed through a polarization splitter which splits the light beam into two linearly-polarized components having their respective directions of linear polarization mutually perpendicular. The transmitted beam is passed through a waveplate which rotates its direction of polarization through 90 degrees so that the two beam components leaving the beam splitter are directed onto the diffraction grating with their directions of polarization parallel to each other and perpendicular to the groove direction of the diffraction rating.

Following diffraction, the light beam components are directed to the dihedral reflector which reflects them back to the diffraction grating. Following diffraction a second time, the light beam components are returned to the polarization beam splitter which recombines them and passes the recombined light beam through the collimator in the opposite direction to focus it and direct it to the input/output port. In traversing the diffraction grating and dihedral reflector the light beam components both follow exactly the same path, but in opposite directions.

A disadvantage of their design arises from the fact that the light beam components are recombined and leave via the same exit port. Specifications for optical spectrum analyzers require the back-reflection caused by the analyzer to be below certain levels so as not to affect the equipment which is being tested. Consequently, an optical circulator can be used in the approach of Lefevre et al. to separate the input light beam from the output light beam and avoid back reflection. The insertion loss and isolation of the circulator vary with wavelength and imperfections in the circulator introduce cross-talk, i.e. coupling of energy from the input light beam directly to the output light beam within the circulator.

Instead of a circulator, Lefevre et al. could use a coupler to separate the input and output light beams and an isolator to reduce optical back reflection significantly Both the insertion loss and the isolation capability of such an isolator usually are wavelength dependent. Moreover, the coupler would introduce insertion loss of at least 6 dB, e.g. 3 dB in each direction for an ideal 3 dB (50/50) coupler. Also, directivity of the coupler introduces cross-talk between unfiltered input and output ends.

In general, the use of components such as couplers, circulators and isolators is accompanied by an inevitable inherent wavelength-dependent polarization-dependent loss, that cannot readily be compensated for, or taken into account.

With the increasing use of Dense Wavelength Division Multiplexing (DWDM), optical spectrum analyzers may be used to scan as many as 128 wavelengths. In view of this level of direct cross-talk, the optical "noise floor" existing at the detection/receiver will increase proportionally with the number of channels, whereas the signal strength of each individual channel is fixed. This degrades optical signal-to-noise ratio (OSNR) of the instrument.

A further disadvantage arises from the fact that the separation of the input beam into constituent, orthogonal polarization states occurs within the monochromator section of their design, where the light beams are propagating in free space. This introduces a complication in the optical design and the choice of components, since the beam size may be limited by the clear aperture of the polarization beam splitter, which for cost and availability reasons should be kept as small as possible. On the other hand, the maximum spectral resolution is obtained when the largest possible number of grating grooves are illuminated. The addition of a beam expander (e.g. with anamorphic prisms) to avoid this problem would be unsatisfactory because it would be expensive and unwieldy.

It is noted that Lefevre et al. apparently recognised that the need for an optical circulator or 3-dB coupler could be avoided by placing a separate output fiber immediately adjacent to the input fiber. However, this modification would not entirely solve the problem of significant back-reflection into the input fiber and would not reduce OSNR degradation caused by back scattering, whereby light scattered by components within the monochromator is received by the output fiber.

It is desirable to avoid, or at least reduce, any undue wavelength-dependent polarization-dependent loss in this measurement instrument.

According to Lefevre et al., their optical spectrum analyzer is polarization insensitive. in practice, however, there is a wavelength-dependent loss resulting from polarization dependence of components used in their design, particularly the waveplate. This waveplate exhibits a $\lambda/2$ retardance, resulting In a 90-degree rotation of the linear polarization, for a particular wavelength. As the wavelength of the incident light beam is tuned away from that wavelength, the angle of rotation provided by the waveplate will vary. Consequently, that beam component not having its linear state of polarization (SOP) perpendicular to the grooves of the grating will suffer increased attenuation as compared with the component which has its linear SOP perpendicular to the grooves.

Although this wavelength-dependent loss can be compensated in the firmware of the analyzer, it results in a limitation in the ultimately attainable instrumental sensitivity.

DISCLOSURE OF INVENTION

The present invention seeks to avoid or at least mitigate the afore-mentioned disadvantage.

According to one aspect of the present invention, an optical spectrum analyzer characterized by a diffraction grating (DG), input means (PDM, FP1/1, FP1/2) comprising means (PDM) for decomposing an input light beam to provide first and second light beams (LR, LT) each having a linear state of polarization corresponding to a respective one of two mutually-perpendicular linear states of polarization of the input light beam, and times (FP1/1, FP1/2) for directing the first and second light beams onto the diffraction grating (DG), and output means for directing the first and second lights beams after diffraction to two output ports (FP2/1, FP2/2) such that each port receives substantially exclusively a respective one of the light beams at or about a selected wavelength after diffraction by the diffraction grating, the arrangement being such that, at any particular wavelength within an operating band of the analyzer, the state of polarization of each of the first and second light beams remains substantially unchanged with respect to time.

Each of the first and second light beams may be incident upon the grating with its linear of polarization having any prescribed angle with respect to a corresponding plane of distraction.

Preferred embodiments of the invention further comprise means for effecting wavelength-independent rotation of one or both of the linear states of polarization of the first and second light beams so that the two linear states of polarization are aligned parallel to each other, and the means for directing the first and second light beams onto the diffraction rating does so with the linear states of polarization of the first and second light beams, respectively perpendicular to grooves of the diffraction grating.

The polarization decomposing means may comprise a polarization beam splitter coupled to the monochromator section by a pair of polarization maintaining fibers. One or both of the polarization maintaining fibers may be twisted to provide a required rotation of the state of polarization of the light beam passing therethrough.

According to a second aspect of the invention, there is provided a monochromator comprising a diffraction grating, means for directing first and second light beams of originally mutually-perpendicular linear states of polarization onto the diffraction grating, and two output ports each for receiving, substantially exclusively, a respective one of the linearly-polarized light beams at or about a selected wavelength after diffraction by the diffraction grating, the arrangement being much that, at a particular wavelength, the state of polarization of each of the first and second light beams is preserved.

Preferably, each of the two linearly-polarized light beams is incident upon the diffraction grating with its state of linear polarization parallel to a plane of diffraction of the diffraction grating (i.e. perpendicular to groove direction).

The monochromator may further comprise reflector means for reflecting the light beams leaving the diffraction grating after diffraction a first time so as to return them to the diffraction grating again with the same state of polarization and at a position displaced laterally from the position at which the light beams were first incident thereupon the two output ports receiving respective ones of the linearly-polarized light beams after diffraction a second time.

In this specification, the term "groove" embraces both the physical grooves In a ruled diffraction grating and their functional equivalent in, for example, a holographic grating.

Various features, advantages and objects of the invention will become apparent from the following description of a preferred embodiment which is describe by way of example only with reference, to the accompanying drawings.

Figure 1:
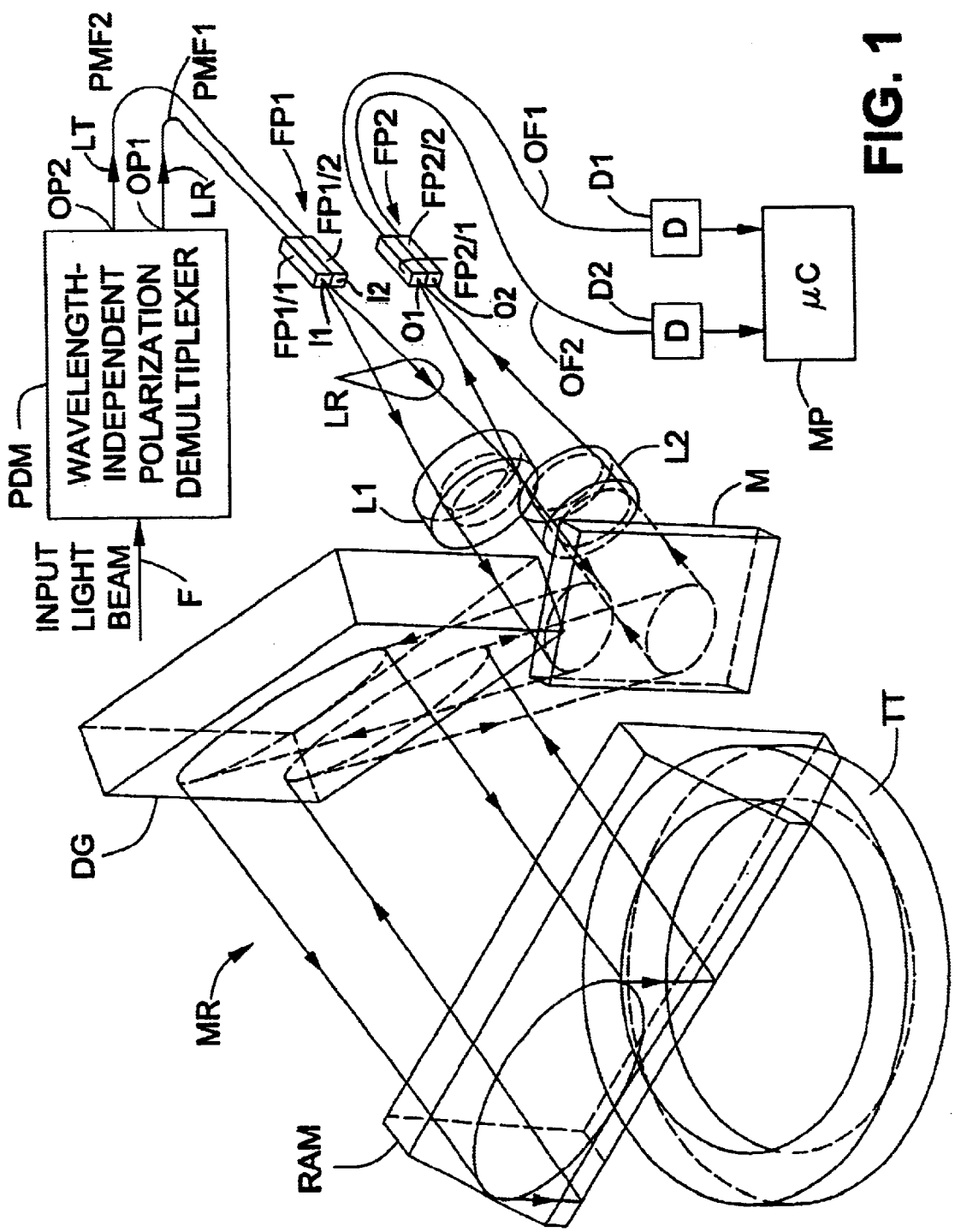
FIG. 1 is a simplified schematic perspective diagram of an optical spectrum analyzer (OSA) embodying the invention which comprises a polarization alignment unit, a monochromator section, and a pair of output ports.
Figure 2:
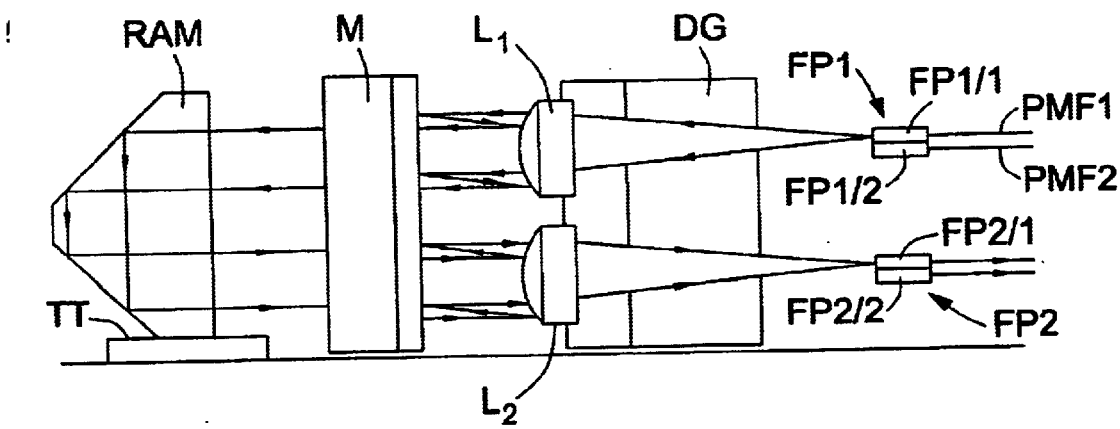
FIG. 2 is a simplified side view of the monochromator section of the OSA.

BEST MODE(S) FOR CARRYING OUT THE INVENTION:

Referring first to FIGS. 1 and 2, an optical spectrum analyzer comprises a wavelength-independent polarization demultiplexer unit PDM (not shown in FIG. 2) and a monochromator section MR. As shown in FIG. 1, the wavelength-independent polarization demultiplexer PDM has an input port to which the input light beam for analysis is supplied via an optical fiber F and two output ports OP1 and OP2 for first and second light beams LR and LT, respectively, having mutually orthogonal linear states of polarization. The output ports OP1 and OP2 are coupled to the monochromator section MR by polarization-maintaining (PM) fibers PMF1 and PMF2, respectively, for conveying the first and second light beams LR and LT to the monochromator section MR. The two PM fibers PMF1 and PMF2 may be single mode or multi-mode at the wavelengths of operation. The birefringence axis of the second polarization-maintaining fiber PMF2 is twisted through 90 degrees relative to that of the first polarization-maintaining fiber PMF1 so that, on arrival of the two linearly-polarized light beams LT and LR at the inputs input ports I1 and I2 of the monochromator section MR, their linear states of polarization (SOP) are parallel to each other. The input ports I1 and I2 of the monochromator section MR comprise respective ends of the first and second polarization-maintaining fiber PMF1 and PMF2 terminated in first and second fiber array terminations FP1/1 and FP1/2, respectively, which, constitute a so-called fiber array FP1. Thus, proximal ends of the polarization maintaining fibers PMF1 and PMF2 are connected to output ports OP1 and OP2, respectively, of the wavelength independent polarization demultiplexer PDM and their distal ends are connected to first and second fiber array terminations FP1/1 and FP1/2, respectively. The first and second fiber array terminations FP1/1 and FP1/2 may be of known kind, for example, having two V-grooves or capillaries into which the ends of the fibers PMF1 and PMF2 are bonded so that the spacing between their cores is accurately determined and they are orientated so as to direct the light beams LR and LT towards a collimating lens L1 in the monochromator section MR.

In addition to the fiber array terminators PP1/1 and PP1/2, and the input collimating lens L1, the monochromator section MR comprises an output focusing lens L2, a plane "folding" mirror M (to render the design more compact), a right-angled dihedral reflector RAM, such as a roof mirror or Porro prism, a reflecting diffraction grating DC and an output fiber array FP2 formed by fiber ay terminators FP2/1 and FP2/2, similar to Array terminators FP1/1 and FP1/2 and output fibers OF1 and OF2. The plane mirror M is optional. It should be appreciated that the ends of each of the input fibers PMF1 and PME2 and the output fibers OF1 and OF2 are the equivalents or the input slits and output slits, respectively, of a classic monochromator design.

Wavelength selection is effected by rotating either the dihedral reflector RAM or the diffraction grating DG, or both of them together. In this preferred embodiment the dihedral reflector RAM is mounted upon tuning means in the form of a turntable device TT, allowing it to be rotated relative to the diffraction grating DG for scanning through the required range of wavelengths. It should be noted that the light beams from fibers FP1/1 and FP1/2 are focused onto fibers FP2/1 and FP2/2, respectively. The monochromator section MR outputs the scanned light beams via the second pair of fibers FP2/1 and FP2/2, respectively, respective ends of which comprise a pair of output ports O1 and O2 of the monochromator section MR and convey the two output light beams LR and LT to an output stage which comprises a pair of detectors D1 and D2, respectively, which may be photodiodes, for example. The detectors D1 and D2 may be coupled to a microprocessor (not shown) which processes the corresponding electrical signals from the detectors. It should also be noted that the output fibers FP2/1 and FP2/2 could be replaced by slits in front of the detectors, or by an appropriate lens/detector arrangement.

In each of the fiber pairs or "arrays" PP1 and PP2, the inter-fiber separation is greater than the "spot size" in the non dispersive dimension (i.e., the vertical direction of FIG. 1) of a signal in the focal plane, by such an amount that cross-talk is substantially avoided. On the other hand, the fibers are sufficiently close together that the two beams follow nearly parallel paths in order substantially to avoid aberrations. In practice, the separation between centres is about 0.25 mm.

Figure 3:
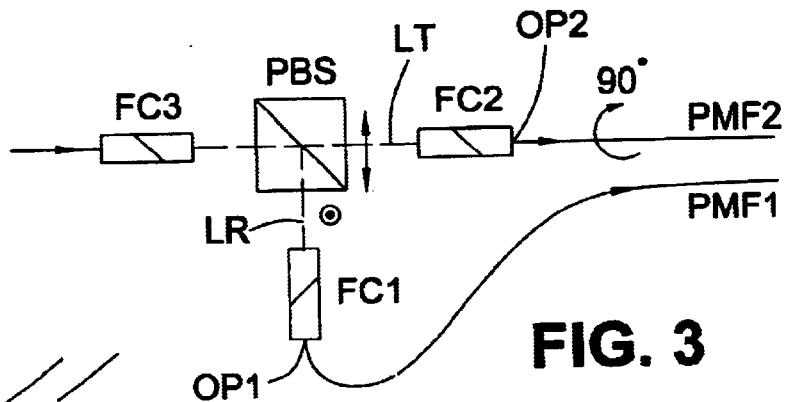
FIG. 3 is a schematic view showing the polarization alignment unit of the OSA in more detail.

As shown in FIG. 3, the wavelength independent polarization demultiplexer PDM comprises three fiber collimators FC1, FC2 and FC3 and a polarization beam splitter PBS. The fiber collimator FC3 receives the input fiber-guided light beam and converts it into a collimated, free-space beam which it directs to the polarization beam splitter PBS. The latter separates the input light beam into two light beams LT and LR, respectively, having mutually-perpendicular linear states of polarization (SOPs) corresponding to original mutually perpendicular states of polarization of the input light beam. The polarization beam splitter PBS directs linearly polarized light beam LR to fiber collimator FC1 and directs the complementary, orthogonal linearly-polarized light beam LT to fiber collimator FC2. The fiber collimators FC1 and FC2 focus the two light beams LR and LT, respectively, into proximal ends of the polarization maintaining fibers PMF1 and PMF2, in each case with the linear state of polarization (SOP) of the launched light aligned with one of the birefringent axes ("slow" or "fast") of the associated one of the PM fibers PMF1 and PMF2. In this particular embodiment, for example, the fiber PMF1 conveys that portion of the initial beam energy corresponding to vertical linear polarization, while fiber PMF1 and PMF2 conveys that corresponding to horizontal linear polarization, as indicated in FIG. 3.

Referring again to FIGS. 1 and 2, the distal ends of polarization maintaining fibers PMF1 and PMF2 are terminate at, and fixed in, the input fiber array FP1 of the monochromator section MR. Before fixing, one or both of the polarization-maintaining fibers PMF1 and PMP2 in order is/are manipulated to ensure that the linear state-of-polarization (SOP) of the light beams LT and LR exiting from the ends of these two fibers have the same, predetermined spatial orientation—in this case parallel to each other. An example of such a manipulation could be twisting of one of the two fibers with respect to the other.

The fibers FP1/1 and FPP1/2 at the input of the monochromator section MR direct the two polarized light beams LR and LT, respectively, onto collimating input lens L1 of the monochronator section MR and are oriented so that the light beams' SOPs will be parallel to the plane of diffraction, i.e., perpendicular to the grooves, when incident upon the diffraction grating DG. As they traverse the other components of the monochromator section MR, the two polarized light beams LR and LT follow similar, but not strictly parallel, paths. For clarity of depiction, however, the path of only one the polarized light beams, LR, is shown in FIGS. 1 and 2. Thus, on leaving the lens L1, the collimated light beam LR is reflected by plane mirror M onto the diffraction grating DG so that the state of polarization of the light beam LR is perpendicular to the grooves of the grating DG. Following reflection and diffraction by the diffraction grating DG, the light beam LR is directed to the right-angled dihedral reflector RAM. The arrangement is such that the light beam LR impinges upon one of the facets of the dihedral reflector RAM at a first angle of the order of 45 degrees, and is reflected to the other facet, which reflects it again at the 90-degree complement of the first angle. S1 that it leaves the dihedral reflector RAM in the opposite direction to that of its arrival and is incident upon the diffraction rating DG again, but at a position displaced perpendicularly with respect to the plane of diffraction in which it was first incident. The diffraction grating DG reflects and diffracts the light beam LR again and directs it via plane mirror M onto output lens L2, which refocusses it into the end of fiber FP2/1 of the second fiber pair FP2. Light beam L1 follows a similar path after being directed onto collimating lens L1 by fiber PP1/2 but is refocussed by lens L2 into the end of fiber FP2/2 of the fiber pair FP2.

Upon leaving the other (output) ends of the fibers FP2/1 and FP2/2, respectively, the light beams LR and LT impinge upon detectors D1 and D2, respectively. Optical fibers OF1 and OF2 couple the array-fibers FP2/1 and FP2/2 to detectors D1 and D2, respectively, so that the diffracted and refocussed light beams LR and LT are applied to the detectors D1 and D2, respectively. The detectors D1 and D2 supply their corresponding electrical signals to a microprocessor MP for processing in the usual way, which might entail combining them electrically. Of course, the detectors could be omitted and optical fibers OF1 and OP2 could convey the light beams LR and LT elsewhere for subsequent detection, processing or analysts. Alternatively, the fibers OF1 and OF2 could be omitted and the array fibers FP2/1 and FP2/2 could supply light beams LR and LT directly to the detectors.

It should be noted that the polarized light beams LR and LT pass through the respective ones of the fibers FP1/1 and FP1/2 and the lens L1 to the diffraction grating DG and, on leaving the grating DG, via the lens L2 to the corresponding one of the fibers FP2/1 and FP2/2, respectively.

Because the decomposition of the input light beams SOP occurs outside of the free-space optics of the monochromator section MR, one is, not constrained by such practical issues as the clear aperture of the polarization beam splitter PBS when determining the working diameters of the lenses L1 and L2. Hence, a relatively large beam diameter can be used, facilitating the illumination of a large number of grating grooves without having to maintain the grating at an extremely oblique and difficult-to-adjust grazing-incidence angle with respect to the incident beams.

Subject to practical limitations on the physical size of the equipment, the lenses and diffraction grating can he relatively large, so as to obtain better resolution.

Figure 4:
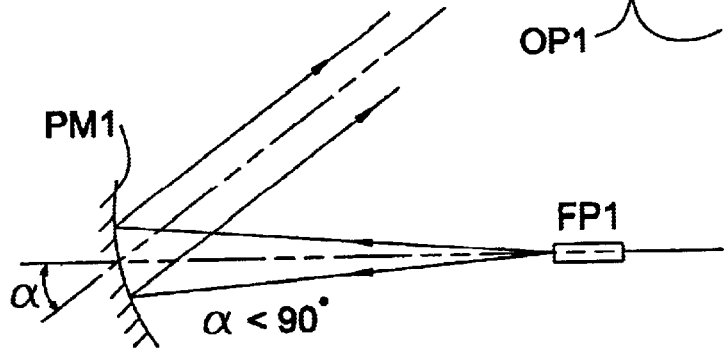
FIG. 4 is a detail view illustrating a first modification to the monochromator section.
Figure 5:
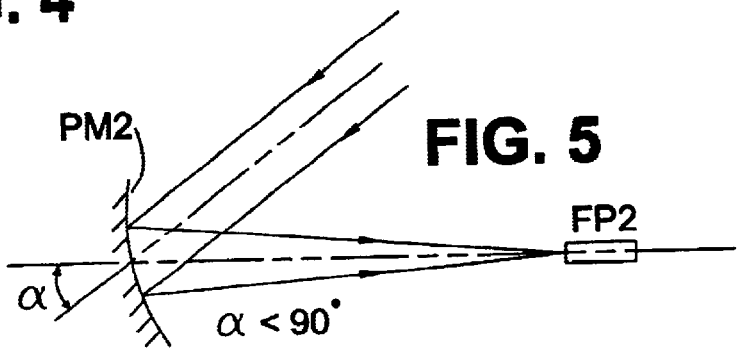
FIG. 5 is a detail view illustrating a second modification to the monochromator section.

It is envisaged that either or both of the lenses L1 and L2 could be replaced by a concave mirror and the above-mentioned advantages still realised. Thus, FIG. 4 illustrates an off-axis paraboloid mirror PM1 for receiving and collimating the light beams from fiber array FP1, before supplying them to the diffraction grating DG/plane mirror M (not shown in FIG. 4). FIG. 5 illustrates an off axis paraboloid mirror PM2 for receiving collimated light beams from the diffraction grating DG/plane mirror M (not shown in FIG. 5) and focusing them onto the output fiber array FP2. When one or more such off-axis paraboloid mirrors PM1, PM2 are used, it might also be possible to omit the plane mirror M add still achieve a compact design.

It should be noted that, because the above-described preferred embodiment of the present invention avoids the use of a waveplate, whose polarization-transforming properties are inherently dependent upon wavelength, the linear states of polarization of the light beams LR and LT exiting the two fibers FP1/1 and FP1/2, respectively, can be oriented so as to lie in the plane of diffraction in order to minimize the losses in the monochromator section MR and maximize the overall performance of the optical spectrum analyzer across a very wide wavelength range. Likewise, the absence of other inherently wavelength dependent elements, such as isolators, circulators or 3-dB couplers, allows embodiments of the present invention to maintain their performance over a wise spectral range.

It should also be noted that embodiments of the present invention which use two separate detectors D1 and D2, which can be independently calibrated via a microprocessor, allow for increased flexibility in the optical design and alignment. For instance, although the overall performance of embodiments of this invention, in particular their optical sensitivity and the independence of this optical sensitivity to the state of polarization of the signal to be measured, is optimized when the states of polarization of the two light beams emanating from FP1/1 and PP1/2, respectively, are parallel to each other and parallel to the plane of diffraction of the grating, embodiments of the invention can also function with degraded sensitivity specifications if these two light beams have different, arbitrary and even wavelength-dependent states of polarization, provided that, when the light beams arrive at the output array FP2, their states of polarization do not change with time at any given wavelength. This is a consequence of the fact that, for a given state of polarization and wavelength of a beam passing through the monochromator section MR, the polarization and wavelength dependencies of the detection can be calibrated in the microprocessor.

Hence, although it is preferable to use a twisted polarization-maintaining fiber to rotate the state of polarization of one or each of the light beams, it would be possible to use a wavelength-dependent rotation device, such as a waveplate, instead, and calibrate the optical spectrum analyzer (specifically the microprocessor) over the normal range of wavelengths so as to ensure consistent measurements at any particular wavelength. This is possible because the first and second light beams are not recombined after leaving the diffraction grating and before detection. As mentioned hereinbefore, the use of a waveplate could limit the ultimately-attainable sensitivity.

The beam splitter PBS may be a conventional polarization beam splitter which can handle a range from 100 nanometers to 2000 nanometers approximately. Such beam splitters die readily available.

It should also be noted that the diffraction grating DG could be, for example, a holographic grating, or any other suitable kind of grating. It is also envisaged that the tuning means could rotate the diffraction grating DG instead of, or in addition to, the dihedral prism RAM.

It should be appreciated that the invention comprehends a monochromator formed by omitting the detectors D1 and D2, the microprocessor MP, and possibly the rotation device TT, and adding means for recombining the diffracted light beams LR and LT. Then the two light beams LR and LT could be combined optically using, for example, a polarization multiplexer or the above-described polarization beam splitter PBS in reverse.

INDUSTRIAL APPLICABILITY

Advantageously, in embodiments of the present invention, the states of polarization of the first and second light beams do not change substantially with tine regardless of typical environmental changes, such as normal fluctuation in temperature and vibration.

Moreover, an advantage of embodiments of the invention, in which the input ports and output ports are completely separate, is that the difficulties of back reflection along the optical input path, and direct cross-talk between input and output, are avoided substantially completely, which is very important for high density wavelength division multiplexing (HDWDM) applications.

What is claimed is:

1. An optical spectrum analyzer comprising a diffraction grating (DG), input means (I1,I2) comprising means (PDM) for decomposing an input light beam to provide first and second light beams (LR,LT) each having a linear state of polarization corresponding to a respective one of two mutually-perpendicular linear states of polarization of the input light beam, and means (I1,I2) for directing the first and second light beams onto the diffraction grating (DG), and output means for directing the first and second lights beams after diffraction to two output ports (O1,O2) such that each port receives substantially exclusively a respective one of the light beams at or about a selected wavelength after diffraction by the diffraction grating, the arrangement being such that, at any particular wavelength within an operating band of the analyzer, the state of polarization of each of the first and second light beams remains substantially unchanged with respect to time.

2. An optical spectrum analyzer according to claim 1, wherein each of the first and second light beams is incident upon the diffraction grating (DG) with its linear state of polarization parallel to a corresponding plane of diffraction of the diffraction grating.

3. An optical spectrum analyzer according to claim 1, wherein the input means comprises means (PMF1, PMF2) for effecting wavelength-independent rotation of one or both of the linear states of polarization of the first and second light beams so that said two linear states of polarization are aligned parallel to each other, and the means (I1,I2) for directing the first and second light beams onto the diffraction grating (DG) do so with the linear states of polarization of the first and second light beams, respectively, parallel to each other and parallel to a corresponding plane of diffraction of the diffraction grating.

4. An optical spectrum analyzer according to claim 3, wherein the rotation effecting means (PMF1,PMF2) comprises at least one twisted polarization-maintaining fiber (PMP2).

5. An optical spectrum analyzer according to claim 1, further comprising tuning means (TT) for enabling scanning and selection of said selected wavelength.

6. An optical spectrum analyzer according to claim 1, further comprising reflector means (RAM) for reflecting said first and second light beams (LR,LT) leaving the diffraction grating after diffraction a first time so as to return said first and second light beams to the said diffraction grating with a displacement perpendicular to the plane of diffraction in which the first diffraction occurred, so that the light beams are diffracted a second time, and the output means directs the light beams to the output ports (O1,O2) following the second diffraction.

7. An optical spectrum analyzer according to claim 6, wherein the reflector means (RAM) comprises a roof prism.

8. An optical spectrum analyzer according to claim 1, wherein the diffraction grating is substantially planar and the input means further comprises collimating means (L1;PM1) for substantially collimating each of said first and second light beams emanating from the directing means (I1,I2) and applying the collimated first and second light beams to the diffraction grating (DG), and the output means further comprises focusing means (L2;PM2) for focusing the diffracted collimated light beams onto the output ports (O1, O2), respectively.

9. An optical spectrum analyzer according to claim 8, wherein the collimating means comprises a lens (L1).

10. An optical aspectrum analyzer according to claim 8, wherein the focusing means comprises a lens (L2).

11. An optical spectrum analyzer according to claim 8, wherein the collimating means comprises an off-axis paraboloid mirror (PM1) disposed between the directing means (I1,I2) and the diffraction grating for collimating the first and second light beams emanating from the directing means and applying the collimated beams to the diffraction grating (DG).

12. An optical spectrum analyzer according to claim 8, wherein the focusing means comprises an off-axis paraboloid minor (PM2) disposed between the diffraction grating and the output ports (O1,O2), for collecting the substantially collimated beams emanating from the diffraction grating (DG) and focusing said beams onto the output ports (O1, O2), respectively.

13. An optical spectrum analyzer according to claim 8, wherein the collimating means comprises an off-axis paraboloid mirror (PM1) disposed between the directing means (I1,I2) and the diffraction grating for collimating the first and second light beams emanating from the directing means and applying the collimated beams to the diffraction grating (DG), and wherein the focusing means comprises a second off-axis paraboloid mirror(PM2) disposed between the diffraction grating and the output ports, for receiving the substantially collimated beams emanating from the diffraction grating (DG) and focusing said beams onto the output ports (O1,O2), respectively.

14. An optical spectrum analyzer according to claim 6, wherein the reflector means (RAM) comprises a Porro prism.

15. an optical spectrum analyzer according to claim 8, further comprising a plane reflector (M) in the path of each collimated light beam.

16. An optical spectrum analyzer according to claim 1, wherein the decomposing means (PDM) comprises a wavelength-independent polarization demultiplexer.

17. An optical spectrum analyzer according to claim 16, wherein the wavelength-independent polarization demultiplexer comprises a polarization beam splitter (PBS).

18. An optical spectrum analyzer according to claim 1, further comprising a pair of detectors (D1,D2) for receiving light beams from the output ports (O1,O2).

19. A monochromator comprising a diffraction grating (DG), means (I1,I2) for directing first and second light beams (LR,LT) having mutually-perpendicular linear states of polarization onto the diffraction grating (DG), and two output ports (O1,O2) each for receiving substantially exclusively a respective one of the linearly-polarized light beams at or about a selected wavelength after diffraction by the diffraction grating (DG), the arrangement being such that, at a particular wavelength, the state of polarization of each of the first and second light beam is preserved.

20. A monochromator according to claim 19, wherein the directing means (I1,I2) directs each of the two linearly-polarized light beams onto the diffraction grating (DG) with its state of linear polarization parallel to a plane of diffraction of the diffraction grating.

21. A monochromator according to claim 19, further comprising reflector means for reflecting the light beams leaving the diffraction grating after diffraction a first time so as to return them to the diffraction grating again at a position displaced perpendicularly to the plane of diffraction in which the first diffraction occurred, the two output ports receiving respective ones of the linearly-polarized light beams after diffraction a second time.

22. A monochromator according to claim 19, wherein the diffraction grating is substantially planar, and the monochromator further comprises collimating means (L1;PM1) for substantially collimating each of said first and second light beams emanating from the directing means (I1,I2) and applying the collimated first and second light beams to the diffraction grating (DG), and the output means further comprises focusing means (L2;PM2) for focusing the diffracted collimated light beams onto the output ports (O1, O2), respectively.

23. An optical spectrum analyzer comprising:

(i) light input means (F), (ii) polarization controlling means (PDM, PMF1, PMF2);

(iii) a scanning monochromator (MR) having a diffraction grating (DG), first and second input ports (I1,I2) and corresponding first and second output ports (O1,O2), and (iv) first and second detection means (D1, D2) coupled to the output ports (O1,O2), respectively, the polarization controlling means (PDM, PMF1, PMF2) being configured to decompose an input light beam received via the light input means (F) to provide first and second light beams (LR,LT) each having a linear state of polarization corresponding to a respective one of two mutually-perpendicular linear states of polarization of the input light beam, and to supply the first and second light beams (LR,LT) to the first and second input ports (I1,I2), respectively, for directing onto the diffraction grating (DG) with the linear states of polarization having a prescribed orientation relative to the diffraction plane, the input ports (I1,I2) being spaced from each other and the output ports (O1,O2) correspondingly spaced apart so that each of the output ports (O1,O2) will receive substantially exclusively the respective one of the first and second diffracted light beams for conveyance to the corresponding one of the first and second detectors, the arrangement being such that, at any particular wavelength within an operating band of the analyzer, the state of polarization of each of the first and second light beams remains substantially unchanged with respect to time.

\* \* \* \* \*